United States Patent
Elangovan et al.

(10) Patent No.: US 12,485,711 B2
(45) Date of Patent: Dec. 2, 2025

(54) SLOW LEAK DETECTION SYSTEMS AND METHODS

(71) Applicant: Ford Global Technologies, LLC, Dearborn, MI (US)

(72) Inventors: Vivekanandh Elangovan, Canton, MI (US); Keith Weston, Canton, MI (US); John Robert Van Wiemeersch, Novi, MI (US); Joshua Wheeler, Trenton, MI (US); Sai Prasanth Velusamy, Canton, MI (US)

( * ) Notice: Subject to any disclaimer, the term of this patent is extended or adjusted under 35 U.S.C. 154(b) by 195 days.

(21) Appl. No.: 18/454,497

(22) Filed: Aug. 23, 2023

(65) Prior Publication Data
US 2025/0065677 A1    Feb. 27, 2025

(51) Int. Cl.
  *B60C 23/04*    (2006.01)
  *G01M 3/24*    (2006.01)
  *G07C 5/00*    (2006.01)

(52) U.S. Cl.
  CPC ........... *B60C 23/0486* (2013.01); *G01M 3/24* (2013.01); *G07C 5/006* (2013.01); *G07C 5/008* (2013.01)

(58) Field of Classification Search
  None
  See application file for complete search history.

(56) References Cited

U.S. PATENT DOCUMENTS

| | | | |
|---|---|---|---|
| 4,365,514 A | 12/1982 | Ho | |
| 6,281,787 B1 | 8/2001 | Lerg et al. | |
| 2002/0075144 A1* | 6/2002 | DeZorzi | B60C 23/0408 340/447 |
| 2003/0164030 A1* | 9/2003 | Walker | H01Q 1/325 73/146 |
| 2019/0084359 A1* | 3/2019 | Hassani | H04B 17/318 |
| 2019/0255893 A1 | 8/2019 | Van Wiemeersch et al. | |
| 2022/0063357 A1* | 3/2022 | Singh | B60C 23/0457 |
| 2022/0176758 A1* | 6/2022 | Degenhardt | B60C 23/0479 |
| 2023/0001752 A1* | 1/2023 | Dolberg | B60C 23/0415 |

(Continued)

FOREIGN PATENT DOCUMENTS

| | | | | |
|---|---|---|---|---|
| CN | 102717671 A | | 10/2012 | |
| CN | 116541783 A | * | 8/2023 | ........... G06F 18/243 |

(Continued)

OTHER PUBLICATIONS

Machine translation of CN-116552172-A (Year: 2023).*

(Continued)

*Primary Examiner* — Anne Marie Antonucci
*Assistant Examiner* — Kyle S Park
(74) *Attorney, Agent, or Firm* — Frank Lollo; Eversheds Sutherland (US) LLP (57) ABSTRACT

A system communicatively coupled with a vehicle is disclosed. The system may include a detection unit configured to measure sound in proximity to a vehicle tire, and a processor communicatively coupled with the detection unit. The processor may be configured to obtain inputs from the detection unit, and identify a slow leakage in the vehicle tire based on the inputs. The processor may be further configured to output a notification responsive to a slow leakage identification. The system may be a part of the vehicle or may be part of a user device communicatively coupled to the vehicle.

14 Claims, 6 Drawing Sheets

(56) References Cited

U.S. PATENT DOCUMENTS

| | | | | |
|---|---|---|---|---|
| 2023/0103577 A1* | 4/2023 | Aceto | ............... | A61M 1/985 604/319 |
| 2024/0133760 A1* | 4/2024 | Kobayashi | .......... | G01L 19/0092 |
| 2024/0402035 A1* | 12/2024 | Barbalata | .............. | G01M 17/02 |
| 2025/0128549 A1* | 4/2025 | Yanagida | ............ | B60C 23/0408 |

FOREIGN PATENT DOCUMENTS

| | | | |
|---|---|---|---|
| CN | 116552172 A | * | 8/2023 |
| WO | 2022150999 A1 | | 7/2022 |

OTHER PUBLICATIONS

Machine translation of CN-116541783-A (Year: 2023).*
Bernard Akindade Adaramola et al., Development of a Dynamic Sensor for Monitoring Tyre Pressure, ABUAD Journal of Engineering Research and Development, vol. 1, Issue 1, Oct. 18, 2017, pp. 67-73.

* cited by examiner

SLOW LEAK DETECTION SYSTEMS AND METHODS

FIELD

The present disclosure relates to vehicles and more particularly to systems and methods for detecting slow leakage in vehicle components.

BACKGROUND

Many modern vehicles have in-built tire-pressure monitoring systems (TPMSs) to assist the operators in monitoring the tire condition. Specifically, in some instances, a TPMS uses tire/wheel sensors to measure tire air pressure. The TPMS outputs a notification to the vehicle operator when the air pressure in the vehicle tire is less or greater than a predefined threshold or when there is a certain threshold change in the air pressure.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure describes a system and method to detect a slow leakage in a vehicle components such as tire of a vehicle. The system may include a detection unit that may be configured to measure sound associated with the slow leakage emanating from the vehicle tire. The detection unit may include ultrasonic sensors that may be configured to measure the sound in the ultrasonic frequency range. The system may further include a processor that may be configured to obtain inputs from the detection unit, determine the slow leakage based on the inputs, and output a notification to a user interface to indicate the slow leakage in the vehicle tire.

In some aspects, the system may be part of the vehicle. In other aspects, the system may be part of a user device (e.g., a mobile phone, a smart watch, another vehicle, etc.) that may be communicatively coupled with the vehicle. For example, the system may be part of a user device that may act as phone-as-a-key for the vehicle. When the system may be part of the vehicle, the detection unit may include ultrasonic sensors that may be in-built in the vehicle. On the other hand, when the system may be part of the user device, the detection unit may include ultrasonic sensors that may be in-built in the user device.

In further aspects, the system may be configured to determine or identify a tire location (e.g., location of a tire in which there may be a leakage) in the vehicle. For example, when the system is part of the vehicle, the system processor may obtain inputs from different ultrasonic sensors in-built in the vehicle and may determine/identify the location of the ultrasonic sensor that may have detected the slow leakage. Responsive to such determination/identification, the system processor may identify the tire location based on identified ultrasonic sensor location. When the system is part of the user device, the system processor may obtain a user device location in proximity to the vehicle where the ultrasonic sensors associated with the user device may have detected the slow leakage and may identify the tire location based on the obtained user device location. Responsive to obtaining the tire location, the system may notify the tire location to the user interface.

In further aspects, the system processor may be configured to activate the detection unit when a predetermined condition may be met. For example, when the detection unit may be part of the user device, the system processor may activate the detection unit when the user device may be in proximity to the vehicle. In another example, when the detection unit may be part of the vehicle, the system processor may activate the detection unit when the pressure in a vehicle tire (obtained from vehicle tire-pressure monitoring systems (TPMSs)) may be less than a first threshold value or when difference between pressures of different tires may be greater than a second threshold value.

The present disclosure discloses a system and method that facilitates detection of slow leakage in vehicle tires. The system may utilize existing ultrasonic sensors in the vehicle and/or the user device to detect slow leakage in vehicle tires. Thus, the system may not require additional or dedicated components to detect the slow leakage. The system may further notify the slow leakage and the tire location to the vehicle operator in a timely manner, so that the vehicle operator may take remedial actions.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

Figure 1:
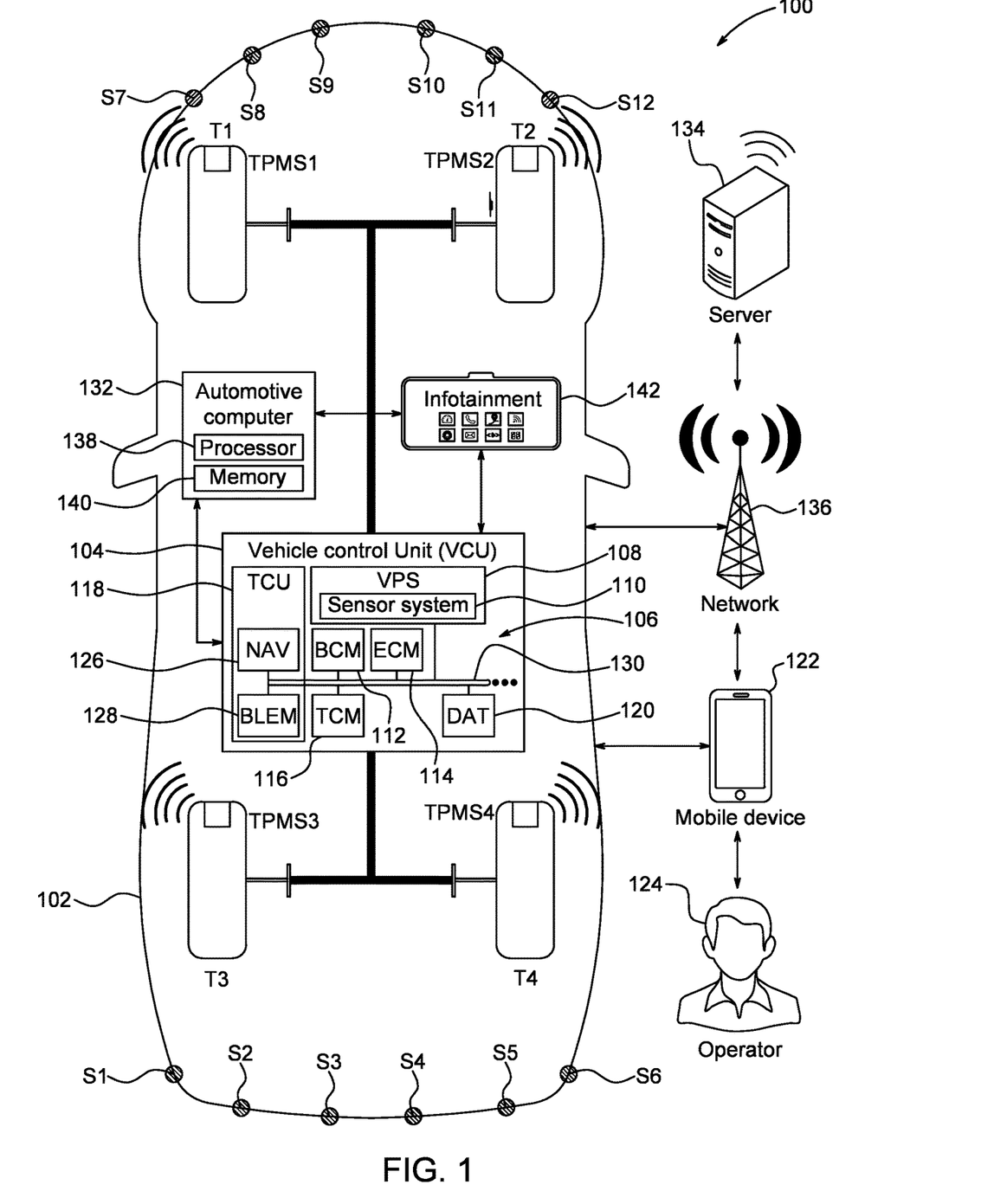
FIG. 1 depicts an example environment in which techniques and structures for providing the systems and methods disclosed herein may be implemented.

FIG. 1 depicts an example environment 100 in which techniques and structures for providing the systems and methods disclosed herein may be implemented. The environment 100 may include a vehicle 102. The vehicle 102 may take the form of any passenger or commercial vehicle such as, for example, a car, a work vehicle, a crossover vehicle, a van, a minivan, a truck, a taxi, a bus, etc. Further, the vehicle 102 may be a manually driven vehicle and/or be configured to operate in a fully autonomous (e.g., driverless) mode and/or partially autonomous mode and may include any powertrain such as, for example, a gasoline engine, one or more electrically-actuated motor(s), a hybrid system, etc. Although FIG. 1 depicts a four-wheeler vehicle, the present disclosure may also be applied to two-wheeler vehicles such as electric bicycles, scooters, motorcycles, etc.

The vehicle 102 may include four tires T1, T2, T3, T4, where T1 may be the front left tire, T2 may be the front right tire, T3 may be the back left tire, and T4 may be the back right tire.

In some aspects, the vehicle 102 may include one or more sensors mounted in or on, affixed to, embedded in, or otherwise coupled to the tires T1-T4. For instance, the tires T1-T4 may include tire pressure monitoring systems 1-4 (TPMSs 1-4) that may be configured to detect/monitor tire pressure and/or other characteristics of the tires T1-T4.

In some aspects, the vehicle 102 may include a Vehicle Control Unit (VCU) 104 that may include a plurality of electronic control units (ECUs) 106 and a Vehicle Perception System (VPS) 108 having connectivity with and/or control of one or more vehicle sensory system(s) 110. The vehicle sensory system(s) 110 may include a plurality of ultrasonic sensors S1-S12. The ultrasonic sensors S1-S12 may be in-built in the vehicle 102. The ultrasonic sensors S1-S12 may be configured to measure sound in proximity to the vehicle tires T1-T4 in the ultrasonic frequency range (e.g., above 20 kHz), monitor vehicle surroundings, measure distance from external objects, and/or the like. In some aspects, the ultrasonic sensors S1-S12 may be positioned around the vehicle 102, as depicted in FIG. 1. For example, six ultrasonic sensors may be positioned in a vehicle front portion and six ultrasonic sensors may be positioned in a vehicle rear portion. In some aspects, the ultrasonic sensors S1-S12 may be disposed on vehicle glass and/or vehicle rigid structure. The ultrasonic sensors S1-S12 may be any type of ultrasonic sensors, which may include short-range ultrasonic sensors and long-range ultrasonic sensors.

Although the description above describes an aspect where the vehicle 102 includes twelve ultrasonic sensors, the present disclosure is not limited to the described aspect. The vehicle 102 may include more or a less count of ultrasonic sensors, without departing from the present disclosure scope. Further, the vehicle sensory system(s) 110 may include other sensors as well, in addition to the ultrasonic sensors S1-S12. For example, the vehicle sensory system(s) 110 may include steering wheel sensors, interior and/or external vehicle cameras, sitting area sensors, weight sensors, ambient light sensors, rain sensors, and/or the like.

The ECUs 106 may communicatively couple with the TPMSs 1-4 and/or the ultrasonic sensors S1-S12. In some aspects, the ECUs 106 may include one or more modules/units, such as, a Body Control Module (BCM) 112, an Engine Control Module (ECM) 114, a Transmission Control Module (TCM) 116, a Telematics Control Unit (TCU) 118, a Driver Assistances Technologies (DAT) controller 120, and the like. In some aspects, the ECUs 106 may control one or more vehicle operations using these units and by receiving inputs from human drivers, an autonomous vehicle controller, the TPMSs 1-4, and/or via wireless signal inputs received via wireless connection from other connected devices, such as a mobile device 122 (having a user interface) associated with a vehicle operator 124, among others.

In one or more aspects, the BCM 112 may include integration of one or more vehicle sensors, vehicle performance indicators, and variable reactors associated with vehicle systems. In addition, the BCM 112 may include processor-based power distribution circuitry that can control functions associated with the vehicle body, such as the tires T1-T4, lights, windows, security, door locks, access control, and various comfort controls. The BCM 112 may also operate as a gateway for bus and network interfaces to interact with remote ECUs (not shown in FIG. 1).

In some aspects, the DAT controller 120 may provide Level-1 through Level-3 automated driving and driver assistance functionality that may include, for example, active parking assistance, trailer backup assistance, adaptive cruise control, lane keeping, and/or driver status monitoring, among other features. The DAT controller 120 may obtain input information via the vehicle sensory system(s) 110, which may include sensors disposed on vehicle interior and/or exterior portions. In particular, the DAT controller 120 may receive information associated with the tire conditions from the TPMSs 1-4, the ultrasonic sensors S1-S12, vehicle occupancy, driver functions, vehicle functions, environmental inputs, and other similar information from the vehicle sensory system(s) 110.

In some aspects, the TCU 118 may be configured and/or programmed to provide vehicle connectivity to wireless computing systems onboard and off board the vehicle 102. The TCU 118 may include a Navigation (NAV) receiver 126 for receiving and processing a Global Positioning System (GPS) signal from GPS (not shown in FIG. 1), a BLE® Module (BLEM) 128 or BUN (BLE, UWB, NFC module), a Wi-Fi transceiver, a Ultra-Wideband (UWB) transceiver, and/or other wireless transceivers (not shown in FIG. 1) that may be configurable for wireless communication between the vehicle 102 and other systems, computers, and modules (including the TPMSs 1-4 and the ultrasonic sensors S1-S12). The TCU 118 may be disposed in communication with the ECUs 106 by way of a bus 130.

In some aspects, the vehicle 102 may include an automotive computer 132 that may be installed in an engine compartment of the vehicle 102 (or elsewhere in the vehicle 102). The automotive computer 132 may be disposed in communication with the VCU 104, the mobile device 122, and one or more server(s) 134. In particular, the automotive computer 132 may share a wired or wireless communication bus with the VCU 104 and may be configured and/or programmed to exchange vehicle data with the VCU 104.

In one or more aspects, the automotive computer 132 may communicate with the server(s) 134 that may be part of a cloud-based computing infrastructure. In particular, the servers(s) 134 may be associated with and/or include a Telematics Service Delivery Network (SDN) that provides digital data services to the vehicle 102 and other vehicles (not shown in FIG. 1) that may be part of a vehicle fleet.

In some aspects, the automotive computer 132 may use wired and/or wireless communication protocols and transceivers to connect with the mobile device 122 associated with the vehicle operator 124. Specifically, the mobile device 122 may communicatively couple with the automotive computer 132 via one or more network(s) 136. The network(s) 136 illustrate an example communication infrastructure in which the connected devices discussed in various embodiments of this disclosure may communicate.

The network(s) 136 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11. UWB, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

In some aspects, the automotive computer 132 may be or include an electronic vehicle controller, having one or more processors 138 and a memory 140. The one or more processors 138 may be disposed in communication with one or more memory devices disposed in communication with the respective computing systems (e.g., the memory 140 and/or one or more external databases not shown in FIG. 1). The one or more processors 138 may utilize the memory 140 to store programs in code and/or to store data for performing aspects in accordance with the disclosure.

The memory 140 may be a non-transitory computer-readable storage medium or memory storing a code for monitoring vehicle tire condition. The memory 140 may include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

In some aspects, the VCU 104 may control vehicle operational aspects by using one or more instruction sets stored in the memory 140.

In some aspects, the automotive computer 132 may connect with a vehicle infotainment system 142 that may provide an interface for the navigation and GPS receiver. The vehicle infotainment system 142 may include a touchscreen interface portion (e.g., a user interface) and may include voice recognition features, biometric identification capabilities that can identify users based on facial recognition, voice recognition, fingerprint identification, or other biological identification means. In additional aspects, the vehicle infotainment system 142 may display messages or notifications on the touchscreen interface, e.g., notifications associated with tire condition associated with the tires T1-T4.

Figure 2:
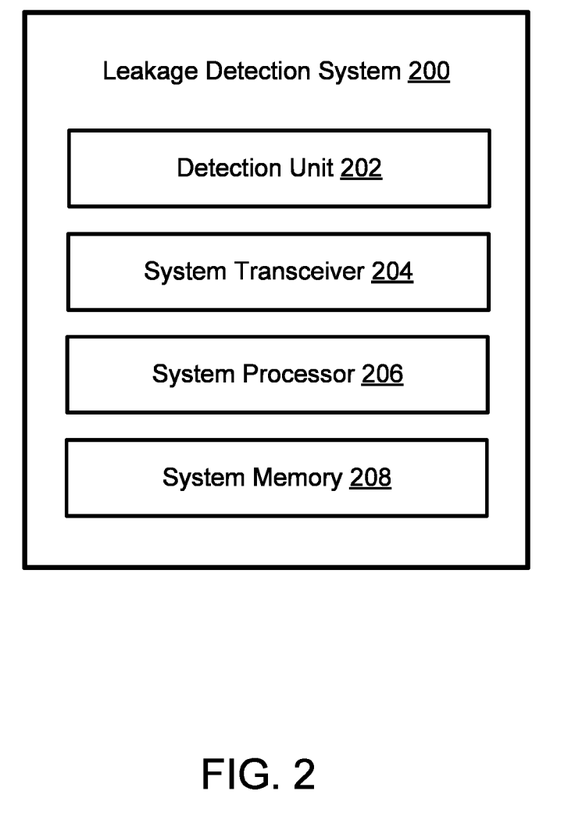
FIG. 2 depicts a block diagram of a leakage detection system in accordance with the present disclosure.

In accordance with the present disclosure, the environment 100 may further include a leakage detection system (shown as leakage detection system 200 in FIG. 2). The leakage detection system ("system") may be configured to determine slow leakage in the tires T1-T4 (or any other vehicle component such as engine hoses) and may notify a vehicle user (e.g., the vehicle operator 124) when there may be a slow leakage in the tires T1-T4.

In certain aspects, the system may be part of the vehicle 102. In other aspects, the system may be part of the mobile device 122 associated with the vehicle operator 124. As described above, the mobile device 122 may be communicatively coupled to the vehicle 102. For example, the mobile device 122 may be configured as phone-as-a-key for the vehicle 102. In an exemplary aspect, the mobile device 122 may be a mobile phone or a smart watch.

When the system may be part of the vehicle 102, the system may be communicatively coupled with the automotive computer 132, the VCU 104, the vehicle infotainment system 142, and/or the like. In this case, the system may be part of the automotive computer 132 or the VCU 104.

In operation, when the system is part of the vehicle 102, the system may obtain inputs from the ultrasonic sensors S1-S12 in-built in the vehicle 102. As described above, the ultrasonic sensors S1-S12 may be configured to measure sound (such as airborne sound, conducted vibrations, structure borne vibrations) in proximity to the tires T1-T4 in the ultrasonic frequency range. Responsive to obtaining inputs from the ultrasonic sensors S1-S12, the system may identify a slow leakage in the tires T1-T4 based on the inputs. The system may output a notification to the vehicle operator 124 responsive to a slow leakage identification. For example, the system may output the notification on the vehicle infotainment system 142, the mobile device 122, and/or the like when the system identifies/determines the slow leakage. The notification may indicate to the vehicle operator 124 that there may be a leakage in one or more vehicle tires T1-T4.

On the other hand, when the system is part of the mobile device 122, the system may obtain inputs from ultrasonic sensors (not shown) in-built in the mobile device 122. For example, when the mobile device 122 may be in proximity to the vehicle 102 (e.g., when the vehicle operator 124 may be moving in proximity to the vehicle 102 or sitting inside the vehicle 102), the ultrasonic sensors associated with the mobile device 122 may measure sound associated with the tires T1-T4 in the ultrasonic frequency range. Responsive to obtaining inputs from the ultrasonic sensors (associated with the mobile device 122), the system may identify a slow leakage in the tires T1-T4 based on the inputs. The system may output a notification to the vehicle operator 124 responsive to slow leakage identification. In this case, the system may output the notification on a mobile device display screen indicating that there may be a leakage in one or more tires T1-T4. In some aspects, when the system is part of the mobile device 122, the system may detect slow leakage in the tires T1-T4 when the mobile device 122 may be communicatively coupled with the vehicle 102 and the mobile device 122 may be disposed in proximity to the vehicle 102.

In some aspects, the system may further be configured to detect leakage in other vehicles (different from the vehicle 102) in proximity to the system and may output a notification based on the detection. For example, the system may detect slow leakage in tires of adjacent vehicles, trailers, buses, big-rigs, motorcycles, etc. in proximity to the system/vehicle 102. In some aspects, the vehicle 102 may be configured to transmit the notification to another vehicle via the server 134. In further aspects, the vehicle 102 may employ any other method to transmit the notification to the other vehicle.

Although the present disclosure describes detecting slow leakage in the tires T1-T4, the leakage detection system may detect leakage in other vehicle components (such as engine hoses, trailers associated with the vehicle 102, etc.) by using the same method and system as described here in the present disclosure without departing from the scope of the present disclosure. In further aspects, the leakage detection system may be configured to obtain inputs from ultrasonic sensors associated with electronic devices (such as cameras having in-built ultrasonic sensors) installed in a parking facility and may be configured to determine the slow leakage based on the inputs obtained from the ultrasonic sensors associated with such electronic devices.

In some aspects, the vehicle 102, the vehicle operator 124, the mobile device 122 and the leakage detection system implement and/or perform operations, as described here in the present disclosure, in accordance with the owner manual and safety guidelines. In addition, any action taken by a user of the vehicle in response to one or more leakage detection system prompts or notifications disclosed herein should comply with all rules and regulations specific to the location and operation of the vehicle (e.g., Federal, state, country, city, etc.). More so, any leakage detection system notifications disclosed herein are for illustrative purposes only. Certain any leakage detection system notifications may be modified and/or omitted depending on the context, situation, and applicable rules and regulations. Further, regardless of the any leakage detection system notifications, users should use good judgement and common sense when operating the vehicle.

Figure 3:
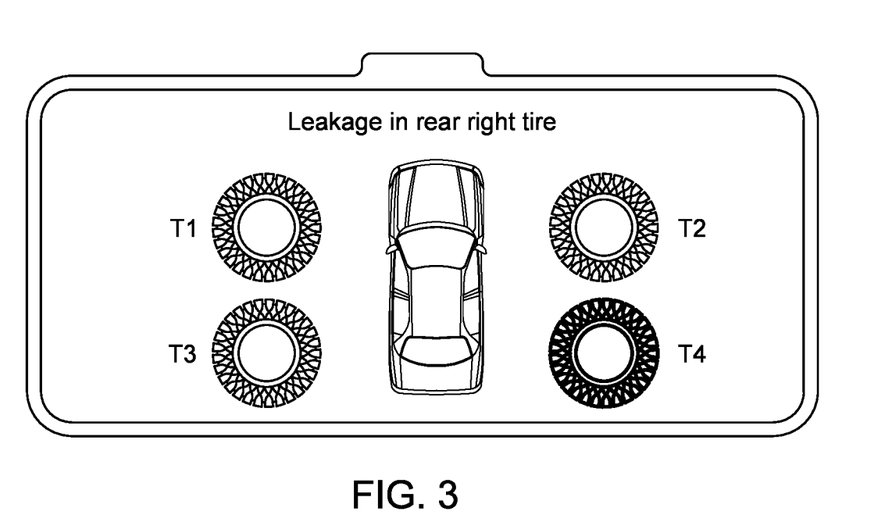
FIG. 3 depicts an example representation of a user notification from a leakage detection system in accordance with the present disclosure.

FIG. 2 depicts a block diagram of a leakage detection system 200 (hereinafter referred as system 200) in accordance with the present disclosure. As described above, the system 200 may be a part of the vehicle 102 or the mobile device 122 (that may be communicatively coupled with the vehicle 102). While explaining FIG. 2, references will be made to FIG. 3. FIG. 3 depicts an example representation of a user notification from the system 200 in accordance with the present disclosure.

The system 200 may include a plurality of units including, but not limited to, a detection unit 202, a system transceiver 204, a system processor 206, and a system memory 208, which may be communicatively coupled with each other. The detection unit 202 may include ultrasonic sensors configured to measure sound in proximity to the tires T1-T4 (e.g., in ultrasonic frequency range, i.e., above 20 kHz). When the system 200 is part of the vehicle 102, the detection unit 202 may include the ultrasonic sensors S1-S12 in-built in the vehicle 102. When the system 200 is part of the mobile device 122, the detection unit 202 may include the ultrasonic sensors in-built in the mobile device 122.

The system transceiver 204 may be configured to receive inputs from the detection unit 202 and may transmit the inputs to the system processor 206. The system transceiver 204 may be further configured to transmit the inputs to the system memory 208 for storage purpose. In further aspects, the system transceiver 204 may be configured to transmit and/or receive information to/from the vehicle components (e.g., the TPMSs 1-4) or any other components/device.

The system processor 206 may utilize the system memory 208 to store programs in code and/or to store data for performing various system operations in accordance with the present disclosure. The system memory 208 may be a non-transitory computer-readable storage medium or memory storing a leak detection program code. The system memory 208 can include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

In operation, the system processor 206 may be configured to obtain inputs from the detection unit 202, for example, via the system transceiver 204 or the system memory 208. Responsive to obtaining the inputs, the system processor 206 may be configured to identify a slow leakage in one or more tires T1-T4 based on the inputs obtained from the detection unit 202 (i.e., based on the sound measured by the ultrasonic sensors).

In some aspects, in the event of slow leakage, the tires T1-T4 may emit leakage sound in a predefined frequency range within the ultrasonic frequency range, and the emitted sound may have a decibel level greater than a predefined threshold valve. Responsive to obtaining the inputs from the detection unit 202, the system processor 206 may determine whether the decibel level of the sound (obtained in the predefined frequency range) is greater than the predefined threshold valve. Responsive to a determination that the decibel level is greater than the predefined threshold valve, the system processor 206 may determine that there may be a slow leakage in one or more tires T1-T4. In some aspects, the system processor 206 may be configured to calibrate external noise to identify sound associated with the slow leakage.

Responsive to a slow leakage determination/identification, the system processor 206 may output a notification to the vehicle operator 124 (e.g., via the mobile device 122 and/or the vehicle infotainment system 142) to provide a notify indicating the slow leakage from one or more tires T1-T4. In some aspects, the system processor 206 may be additionally configured to determine a location of a tire (i.e., identify a vehicle tire that may have slow leakage) based on the inputs obtained from the detection unit 202 and may output a notification indicating the tire location. In such cases, the notification may include information associated with the vehicle tire, e.g., the tire location. For example, the notification may indicate that there may be a leakage in a rear tire T4, as depicted in FIG. 3. As depicted in FIG. 3, the system processor 206 may highlight the tire T4 in the notification to indicate the tire location.

In an exemplary aspect, when the system 200 is part of the vehicle 102, the system processor 206 may obtain inputs from the ultrasonic sensors S1-S12 in-built in the vehicle 102 and may determine slow leakage using the inputs obtained from the ultrasonic sensors S1-S12. In some aspects, the system processor 206 may determine the slow leakage when the vehicle 102 may be stationary. In further aspects, the system processor 206 may determine the slow leakage when the vehicle 102 may be moving, for example, by calibrating external noise. Responsive to the slow leakage determination, the system processor 206 may output the notification (e.g., to indicate the slow leakage) to the vehicle operator 124 via the vehicle infotainment system 142 (or vehicle Human-Machine Interface (HMI)) and/or the mobile device 122.

In some aspects, the system processor 206 may obtain inputs from all ultrasonic sensors S1-S12 and may determine the location of the ultrasonic sensor(s) that may have captured the sound indicating the slow leakage. Responsive to such determination, the system processor 206 may determine the location of the vehicle tire that may be leaking and notify the tire location via the vehicle infotainment system 142 and/or the mobile device 122, as depicted in FIG. 3.

In further aspects, the system processor 206 may be configured to obtain inputs from the TPMSs 1-4 and may determine pressure of all vehicle tires T1-T4 based on the inputs obtained from the TPMSs 1-4. The system processor 206 may be further configured to compare the pressure of each vehicle tire T1-T4 with a first threshold value and may activate the detection unit 202 when the pressure of one or more tires T1-T4 may be less than the first threshold value. Stated another way, the detection unit 202 may remain off in a default state and may be activated (to measure the sound) by the system processor 206 when the pressure in any tire may be less than the first threshold value. In some aspects, responsive to the detection unit 202 being activated, the detection unit 202 may measure the sound pressure level periodically.

In further aspects, the system processor 206 may be configured to calculate differences in pressures associated with the tires T1-T4 and may activate the detection unit 202 when a difference may be greater than a second threshold value. Stated another way, when one or more tires may have an associated pressure substantially greater (or lower) than pressures of other tires, the system processor 206 may activate the detection unit 202. In further aspects, the system processor 206 may obtain the inputs from the detection unit 202 when the detection unit 202 may be activated to perform other operations (e.g., obstacle detection) in the vehicle 102.

In accordance with the present disclosure, when the system 200 may be part of the mobile device 122 (which may be communicatively coupled with the vehicle 102), the system processor 206 may obtain inputs from the ultrasonic sensors in-built in the mobile device 122 and may determine slow leakage using the inputs obtained from the ultrasonic sensors. In this case, the system processor 206 may first determine that the system 200 may be in proximity to the vehicle 102 (that may be communicatively coupled to the system 200) and may activate the detection unit 202 responsive to determining that the system 200 may be in proximity to the vehicle 102. Stated another way, the system processor 206 may obtain inputs from the detection unit 202 when the system 200 (e.g., the mobile device 122) may be in proximity to the vehicle 102 that may be communicatively coupled with the system 200.

In some aspects, the system processor 206 may obtain the inputs from the detection unit 202 when the vehicle 102 may be stationary. Responsive to obtaining inputs from the ultrasonic sensors in-built in the mobile device 122, the system processor 206 may determine the slow leakage and may output the notification to the vehicle operator 124 (e.g., via the mobile device 122), as described above.

In additional aspects, in this case, the system processor 206 may be configured to determine location of the tire T1-T4 that may be leaking and notify the tire location via the mobile device 122, as depicted in FIG. 3. Specifically, in this case, the system processor 206 may be configured to determine the mobile device location around the vehicle 102 and may determine the tire location based on the inputs from the ultrasonic sensors and the mobile device location. For example, when the mobile device 122 may be in proximity to the tire T4 when the system processor 206 identifies the slow leakage (based on the inputs obtained from the detection unit 202), the system processor 206 may determine that the sound associated with slow leakage may be emanating from the tire T4, and thus the tire T4 may be leaking.

Figure 4:
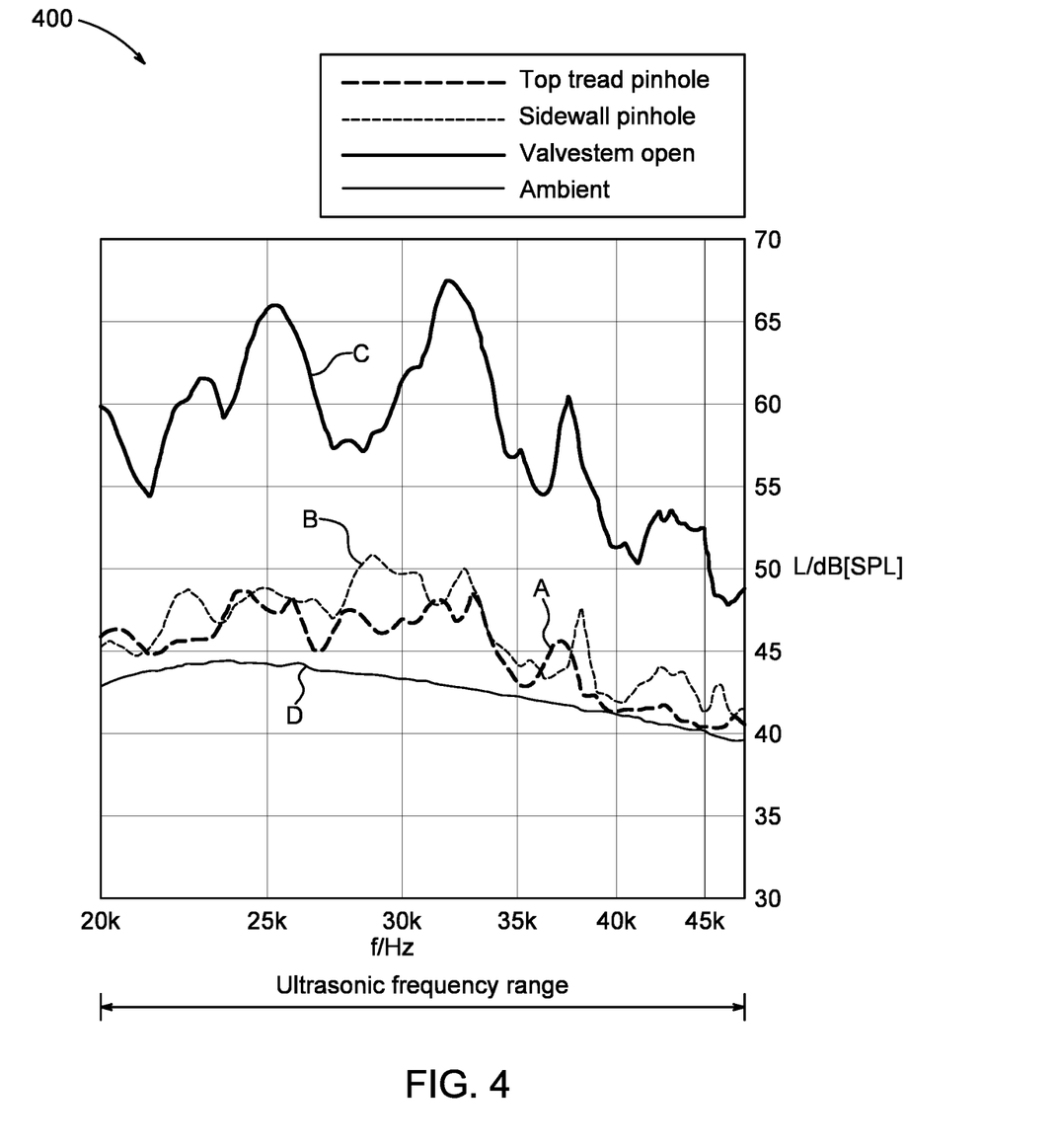
FIG. 4 depicts a first example graph of frequency with decibel levels of output sound in accordance with the present disclosure.
Figure 5:
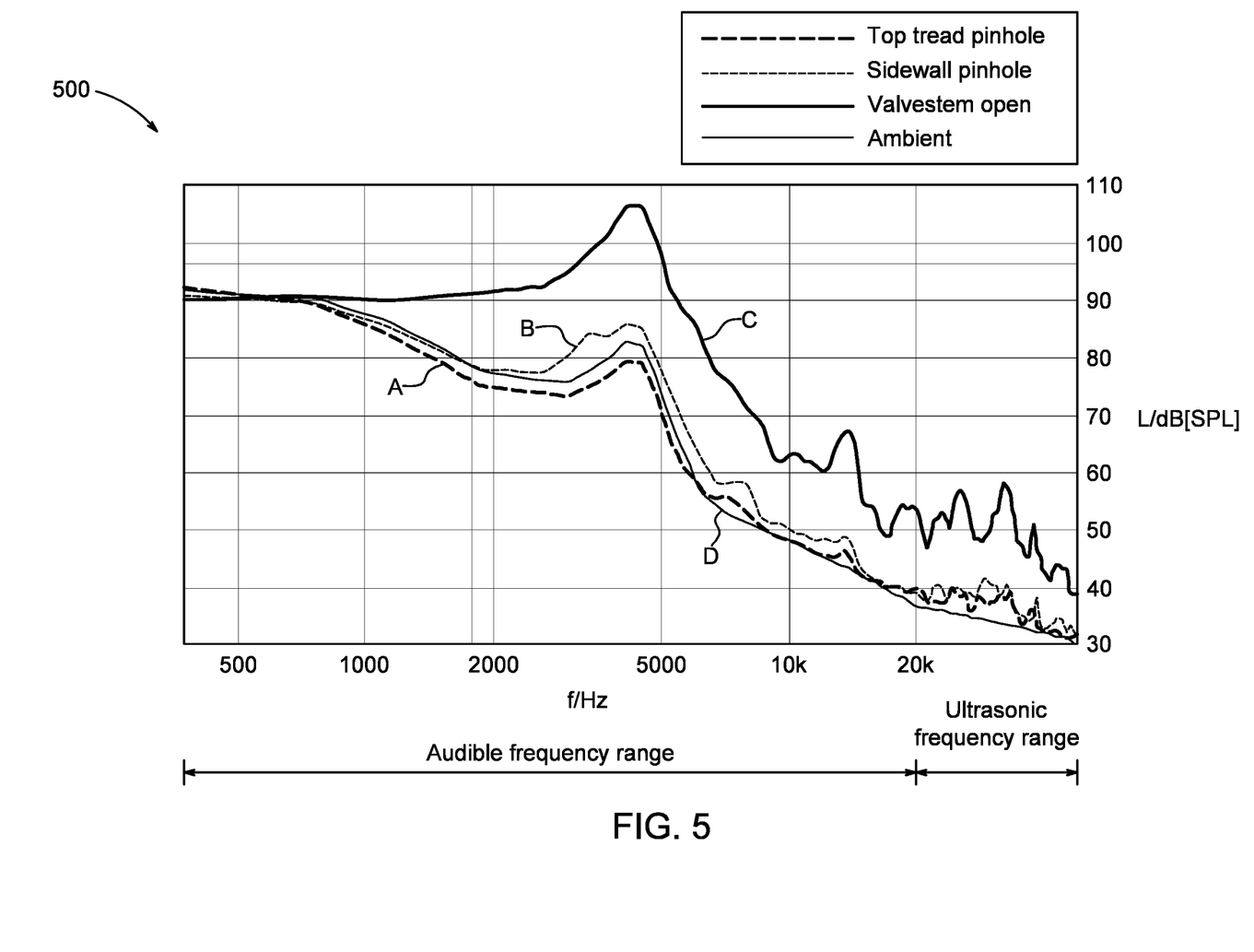
FIG. 5 depicts a second example graph of frequency with decibel levels of output sound in accordance with the present disclosure.

FIG. 4 depicts a first example graph 400 of frequency with decibel levels of output sound in accordance with the present disclosure. FIG. 4 will be explained in conjunction with FIG. 5. FIG. 5 depicts a second example graph 500 of frequency with decibel levels of output sound in accordance with the present disclosure.

The first graph 400 and the second graph 500 indicate airborne sound pressure level measured by a detection unit (e.g., any ultrasonic sensor located in the vehicle 102 or the mobile device 122) for the tires T1-T4. Each of the first and second graphs 400 and 500 includes an X axis representing frequency (e.g., audible and ultrasonic frequency range in kHz) and a Y axis representing airborne sound pressure level in decibel (dB).

In some aspects, the first and second graphs 400 and 500 depict airborne sound pressure levels measured in three different tire leak configurations for a tire, shown as graph lines A, B and C in FIGS. 4 and 5. The tire leak configurations may include a pinhole leak of a tire inner/side wall (shown as line "B"), a pinhole leak of a top tread (shown as line "A"), and a valve stem open (shown as line "C"). In addition, the first and second graphs 400 and 500 depict airborne sound pressure level measured for ambient background noise (e.g., shown as line "D").

As depicted in the first and second graphs 400 and 500, the airborne sound pressure level of ambient background noise (line "D") is less than the airborne sound pressure levels of the three tire leak configurations described above (i.e., lines "A", "B" and "C") in both the audible and ultrasonic frequency range. However, the signal-to-noise (S/N) between the tire sounds (i.e., lines "A", "B", and "C" relative to the ambient background noise (line "D") is generally larger in the ultrasonic band than the audible band. Thus, the use of ultrasonic sensors disposed in the vehicle 102 or the mobile device 122 may more effectively detect sound associated with the slow leakage from the tires T1-T4 to identify a tire than use of sensor only capable of measuring audible sound. In some aspects, the system processor 206 may be configured to compare the airborne sound pressure levels detected by the ultrasonic sensors with the airborne sound pressure level of ambient background noise to determine a type of slow leakage. For example, by comparing the detected sound pressure level with the sound pressure level of ambient background noise, the system processor 206 may determine whether the tire may have a pinhole leak of an inner wall, a pinhole leak of a top tread, or a valve stem open. Responsive to such determination, the system processor 206 may output the type of slow leakage to the vehicle infotainment system 142 and/or the mobile device 122.

Figure 6:
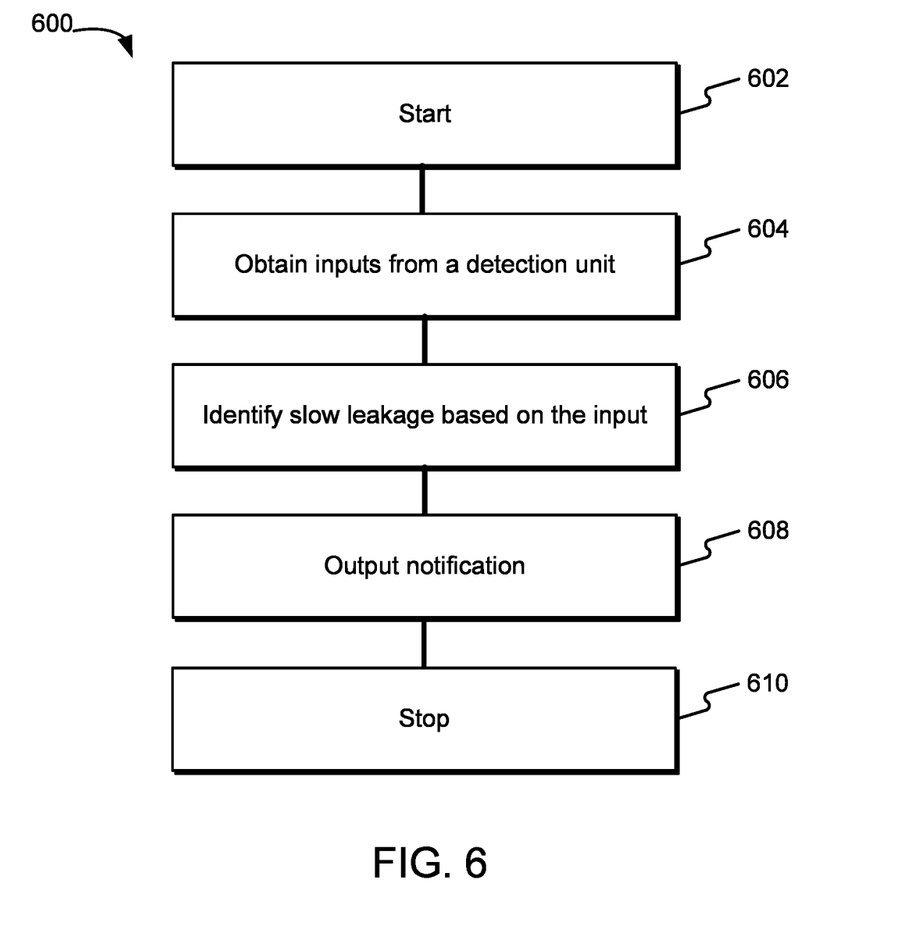
FIG. 6 depicts a flow diagram of an example method for detecting slow leakage in a vehicle tire in accordance with the present disclosure.

FIG. 6 depicts a flow diagram of an example method 600 for detecting slow leakage in a vehicle tire, in accordance with the present disclosure. FIG. 6 may be described with continued reference to prior figures. The following process is exemplary and not confined to the steps described hereafter. Moreover, alternative embodiments may include more or less steps than are shown or described herein and may include these steps in a different order than the order described in the following example embodiments.

Referring to FIG. 6, at step 602, the method 600 may commence. At step 604, the method 600 may include obtaining, by the system processor 206, inputs from the detection unit 202. As described above, the detection unit 202 may include in-built ultrasonic sensors in the vehicle 102 or the in-built ultrasonic sensors in the mobile device 122 (e.g., mobile phone or smart watch).

At step 606, the method 600 may include identifying, by the system processor 206, a slow leakage in the vehicle tire based on the inputs obtained from the detection unit 202 (e.g., based on the sound generated due to slow air leakage).

At step 608, the method 600 may include outputting, by the system processor 206, a notification to the vehicle operator 124 (e.g., via the vehicle infotainment system 142 or the mobile device 122) responsive to the slow leakage identification. The notification may include a tire leakage indication. In some aspects, the system processor 206 may further identify a tire location and may include information associated with the tire location in the notification. At step 610, the method 600 may end.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A system communicatively coupled with a vehicle, the system comprising:
    a detection unit configured to measure, in proximity to a vehicle tire, a sound pressure level associated with a leakage and a sound pressure level associated with ambient background noise, and wherein the system is communicatively coupled with the vehicle; and
    a processor communicatively coupled with the detection unit, wherein the processor is configured to:
    determine that the system that is communicatively coupled with the vehicle is in proximity to the vehicle;
    in response to determining that the system is proximity to the vehicle, activate the detection unit;
    obtain sound pressure level inputs from the detection unit of the system;
    identify the leakage in the vehicle tire based on the sound pressure level inputs;
    compare the detected sound pressure level associated with the leakage to the sound pressure level associated with the ambient background noise;
    determine a leakage type for the leakage based on the comparison; and
    output a notification responsive to a leakage identification, wherein the notification comprises information associated with the determined leakage type;
    wherein the system is part of at least one of a mobile device or a smart watch and the detection unit comprises built-in ultrasonic sensors in the mobile device or the smart watch.

2. The system of claim 1, wherein the processor is further configured to:
    determine a vehicle tire location responsive to the leakage identification; and
    output a notification responsive to the vehicle tire location, wherein the notification comprises information associated with the vehicle tire location.

3. The system of claim 1, wherein the leakage type is selected from at least two of the following leakage types: a pin hole leak of an inner wall; a pin hole leak of a top tread; and a valve stem open.

4. The system of claim 1 further comprising a Tire Pressure Monitoring System (TPMS), wherein the processor is further configured to:
    obtain inputs from the TPMS;
    determine pressure of the vehicle tire based on the inputs;
    compare the pressure with a first threshold value; and
    activate the detection unit when the pressure is less than the first threshold value.

5. The system of claim 1, wherein the processor is further configured to:
    determine pressure of all vehicle tires based on the inputs;
    calculate a difference in pressure between all the vehicle tires; and
    activate the detection unit when the difference is greater than a second threshold value.

6. The system of claim 1, wherein the processor is configured to output the notification on a vehicle Human-Machine Interface (HMI) or mobile device HMI.

7. A method to detect leakage in a vehicle tire, the method comprising:

determining, by a processor of a system, that the system that is communicatively coupled with a vehicle is in proximity to the vehicle;

in response to determining that the system is proximity to the vehicle, activating, by the processor, a detection unit;

obtaining, by the processor, sound pressure level inputs from the detection unit of the system, wherein the detection unit is configured to measure, in proximity to the vehicle tire, a sound pressure level associated with the leakage and a sound pressure level associated with ambient background noise, and wherein the system is communicatively coupled with the vehicle;

identifying, by the processor, the leakage in the vehicle tire based on the sound pressure level inputs;

comparing, by the processor, the detected sound pressure level associated with the leakage to the sound pressure level associated with the ambient background noise;

determining, by the processor, a leakage type for the leakage based on the comparison; and outputting, by the processor, a notification responsive to a leakage identification, wherein the notification comprises information associated with the determined leakage type.

8. The method of claim 7 further comprising:

determining a vehicle tire location responsive to the leakage identification; and outputting a notification responsive to the determination of the vehicle tire location, wherein the notification further comprises information associated with the vehicle tire location.

9. The method of claim 7, wherein the system is part of at least one of a mobile device or a smart watch; and wherein the leakage type is selected from at least two of the following leakage types: a pin hole leak of an inner wall; a pin hole leak of a top tread; and a valve stem open.

10. The method of claim 9, wherein the detection unit comprises built-in ultrasonic sensors in the mobile device or the smart watch.

11. The method of claim 7, wherein the system is part of the vehicle; and wherein the leakage type is selected from at least two of the following leakage types: a pin hole leak of an inner wall; a pin hole leak of a top tread; and a valve stem open.

12. The method of claim 11 further comprising:

obtaining inputs from a Tire Pressure Monitoring System (TPMS);

determining pressure of the vehicle tire based on the inputs;

comparing the pressure with a first threshold value; and activating the detection unit when the pressure is less than the first threshold value.

13. The method of claim 11 further comprising:

determining pressure of all vehicle tires based on the inputs;

calculating a difference in pressure between all the vehicle tires; and activating the detection unit when the difference is greater than a second threshold value.

14. A non-transitory computer-readable storage medium in a distributed computing system, the non-transitory computer-readable storage medium having instructions stored thereupon which, when executed by a processor, cause the processor to:

determine that a system that is communicatively coupled with a vehicle is in proximity to the vehicle;

in response to determining that the system is proximity to the vehicle, activate a detection unit;

obtain sound pressure level inputs from the detection unit of the system, wherein the detection unit is configured to measure, in proximity to a vehicle tire, a sound pressure level associated with a leakage and a sound pressure level associated with ambient background noise, and wherein the system is communicatively coupled with the vehicle and the detection unit comprises built-in ultrasonic sensors in the vehicle;

identify the leakage in the vehicle tire based on the sound pressure level inputs;

compare the detected sound pressure level associated with the leakage to the sound pressure level associated with the ambient background noise;

determine a leakage type for the leakage based on the comparison; and output a notification responsive to a leakage identification, wherein the notification comprises information associated with the determined leakage type.

* * * * *